3,112,167
METHOD OF RETARDING EVAPORATION FROM AN OPEN BODY OF WATER
Allen F. Millikan, Crystal Lake, and Walter E. Kramer, Niles, Ill., assignors to The Pure Oil Company, Chicago, Ill., a corporation of Ohio
No Drawing. Filed Apr. 26, 1961, Ser. No. 105,532
16 Claims. (Cl. 21—60.5)

This invention relates to a method of reducing evaporation losses from open bodies of water and, more particularly, to distributing on the surface of an open water-storage area a polyhydroxymethylated compound in an amount sufficient to create a monomolecular film over the surface of the water.

The loss of water from open water-storage areas by evaporation is a well-known problem. It has been said that evaporation losses from the lakes and streams of the United States exceed the total use of water by all of its cities and towns. Consequently, the development of a practical method to reduce the loss of water by evaporation from lakes, reservoirs, and other open bodies of water is receiving increasing attention. One of the most promising methods of reducing the evaporation is the use of pure, long-chain aliphatic alcohols. The fatty alcohols are spread on the surface of the water to form a monomolecular film which is relatively impervious to water vapor. Cetyl alcohol has been reported to be the most effective material in tests conducted in the United States and Australia. The results of the tests indicate that a monomolecular film of cetyl alcohol spread on the surface of a body of water may reduce the evaporation loss by as much as half in calm weather. However, cetyl alcohol has the undesirable property of supporting certain types of bacterial life, especially Pseudomonas and Flavobacterium species. This can be detrimental to fish and plant life in the water and results in the biological degradation of the film, reducing its effectiveness.

It is an object of this invention to provide an improved method of reducing the evaporation losses from open bodies of water.

It is another object of this invention to provide a method of reducing the evaporation loss from an open body of water by spreading a polyol on the surface of the water.

It is another object of this invention to provide a method of reducing the evaporation losses from open water-storage areas by distributing a monomolecular film of a polyhydroxymethylated compound on the surface of the water.

It is another object of this invention to provide a method of distributing on the surface of water a monomolecular film which is not susceptible to biological degradation.

These and further objects of the invention will be described or become apparent as the specification proceeds.

In accordance with this invention, we have discovered that polyols derived from aromatic-rich petroleum fractions are comparable to long-chain fatty alcohols, such as cetyl alcohol, in ability to form a film on the surface of water and thereby reduce the loss of water from open water-storage areas by evaporation. Due to their aromatic character, these polyols are not bio-degradable and, consequently, are superior to cetyl alcohol for use in mitigating evaporation from open bodies of water. Polyols prepared according to the process of copending application Serial No. 79,514, filed December 30, 1960 by Walter E. Kramer and Allen F. Millikan, were found to be effective.

In this copending application, there is described a process of preparing polyhydroxymethylated hydrocarbons of the formula, $R(CH_2OH)_n$ wherein R is a complex mixture of aromatic and alkylaromatic nuclei derived from solvent extracts obtained in solvent extracting mineral lubricating oil, and $n$ as a value of 2 to 4 inclusive. These polyols have a molecular weight of about 300–875, a melting point of about 80° C. to 100° C., and are insoluble in water. The di- and polyhydroxymethylated compounds may be prepared by chemically reducing the extract di-, and polybasic acids, derived from solvent extracts, by those methods known in the art for transforming a carboxyl group to a hydroxymethyl group. This is accomplished by employing a reducing reagent such as hydrogen with a platinum or copper chromite catalyst, sodium in liquid ammonia, sodium in alcohol, sodium amalgam in alcohol, and lithium aluminum hydride. Another method of preparing the di- and polyhydroxymethylated compounds comprises first preparing the adduct product of the residue of reactable portion of the solvent extracts, which is one step of the process of preparing the acids, in the presence of a reaction solvent, such as tetrahydrofuran, and reacting the adduct directly with formaldehyde gas or a formaldehyde-producing agent such as paraformaldehyde.

By using either procedure, the substantially pure di- or polyhydroxymethylated compounds are obtained by extraction, stripping, and drying of the reaction mixture. Other similar polyols may be expected to be effective.

Both the alkali-metal adduct and the di-, or polycarboxylic acid from which the polyols may be prepared by (1) reduction and (2) reaction sequentially with an alkali metal and paraformaldehyde, respectively, are obtainable by applying either the prior art method of reacting an alkali metal with a complex polynuclear aromatic material or the processes of copending application Serial No. 819,932, filed June 12, 1959, by T. W. Martinek, and copending application Serial No. 79,661, filed December 30, 1960, by W. Kramer, L. Joo and R. Haines. Since the source material, namely, solvent extracts from the manufacture of mineral lubricating oils, does not produce economical yields of adducts or dibasic acids by application of the known prior art procedures, the best methods for their preparation are demonstrated in said copending applications which represent improvements over the prior art.

The alkali-metal adduct is prepared in accordance with application Serial Number 819,932 by reacting about 30 parts of a petroleum fraction rich in polynuclear aromatics, as exemplified by solvent extracts, with 1 to 5 parts of an alkali metal, i.e., sodium, lithoum, potassium, rubidium and cesium, and mixtures and alloys thereof, at a temperature of about −60° to 80° C. in the presence of a reaction solvent, such as methylal, dimethyl glycol ether, dimethyl ether, methyl alkyl ethers, and tetrahydrofuran. The formation of the adduct is promoted by shearing, agitation, providing an excess of alkali metal, using a preformed alkali-metal dispersion in an inert liquid or preforming the alkali-metal dispersion in the complex polynuclear aromatic hydrocarbon. These techniques overcome the resistance of the solvent extracts to react due to impurities therein which coat the alkali metal and slow the reaction or prevent the reaction from starting. A Brookfield counter-rotating stirrer is employed to give continuous shearing and promote the completion of the reaction.

The process described in application Serial No. 79,661, comprises the preparation of a dispersion of alkali metal in a complex aromatic hydrocarbon of petroleum origin, as exemplified by solvent extracts, at a temperature of 130° to 190° C. to form an alkali-metal adduct. A reaction solvent such as methylal, tetrahydrofuran, or dimethyl glycol ether, is then added to the adduct-dispersion while cooling it to a temperature of about 0° C. to 40° C. The reaction mixture is then further cooled to a temperature of about −50° C. to −100° C. in the presence of a sufficient amount of carbon dioxide to carbonate the adduct and form the alkali-metal salts of complex aromatic polycarboxylic acid. The alkali-metal salts may then be acidified to recover the polycarboxylic acid.

The solvent extract starting materials in the aforementioned processes of the copending applications may be characterized by having an average molecular weight of about 300 to 750, have about 1.7 to 3.5 average number of aromatic rings per aromatic molecule and contain about 1.9 to 4.5% by weight of sulfur.

Several different methods are suitable for distributing the film-forming polyols on the surface of a body of water. One method by which a monomolecular film of polyols is applied to the surface of water is by scattering them in the form of a pure, dry powder, having particle sizes ranging from about 0.01 to 0.001 inch in diameter. Another method is dissolving the polyol in a solvent and spreading the solution on the water surface. Volatile solvents such as pentane, ethyl alcohol and kerosene may be used in this method of application. The polyols may also be applied in the form of a suspension or emulsion in water as set forth in U.S. Patent 2,903,330 by R. G. Dressler. However, the latter method of application necessitates the use of a surface-active agent to stabilize the suspension. If the body of water is relatively large, it may be advisable to divide it into smaller areas by the use of a floating grill before the film is applied.

The effectiveness of the polyol and cetyl alcohol in film-forming ability were compared experimentally. The test was conducted by placing about 500 grams of pure water in each of four laboratory crystallization dishes. A film which was comprised of 0.01 gram of extract polyol dissolved in 10 ml. of n-pentane was placed on the surface of one dish, 0.01 gram of cetyl alcohol dissolved in 10 ml. of n-pentane was placed on the water surface in the second dish, and 10 millimeters of n-pentane was placed on the surface of the water in the third dish. No film was placed on the water in the fourth dish, which served for a base for reference. The dishes were placed in a closed box and dry air was passed over them for a period of time. The direction of the air flow was periodically reversed to assure that all of the samples were subjected to about the same average conditions during the test. Periodic determinations were made of the weights of the water-containing dishes, and of the relative humidities of the inlet and exit air streams. Throughout the test period, the relative humidity of the inlet air varied between 12 and 23%, while the relative humidity of the exit air varied between 51 and 61%. The weight losses from the samples are indicated in Table I.

*Table I*

| Dish | Film | Loss in Weight, g. | |
|---|---|---|---|
| | | After 40 hours | After 184 hours |
| 1 | Extract Polyol | 27 | 85 |
| 2 | Cetyl Alcohol | 28.5 | 82 |
| 3 | Pentane | 30 | 119.5 |
| 4 | None | 41 | 108.5 |

In reviewing the results of the experiment, it may be seen that the film of extract polyol afforded approximately the same evaporation protection as the film of cetyl alcohol. This experiment clearly demonstrates the advantage in the utilization of the polyols to reduce loss by evaporation by showing the effectiveness of the two compounds to be the same under laboratory conditions. When applied to the surface of bacteria-containing open bodies of water such as lakes and reservoirs, the cetyl alcohol will support the bacterial life. As previously pointed out, this can be deterimental to fish and plant life in the water and results in biological degradation of the film. The effectiveness of the polyol film will not be reduced by biological degradation of the film since the polyols, being of aromatic character, are not bio-degradable.

The embodiments of the invention in which an exclusive property or privilege is claimed are defined as follows:

1. A method of retarding evaporation from an open body of water which comprises distributing on the surface of the water in an amount sufficient to form a monomolecular film on the surface, water-insoluble, complex, aromatic polyols derived from solvent extracts, characterized as being obtained in the solvent extraction of aromatic-rich mineral lubricating oils using a solvent which extracts said aromatics, said polyols prepared by reacting said solvent extracts with an alkali metal, and reacting the alkali metal-solvent extracts reaction product with an aldehyde of the group consisting of formaldehyde and paraformaldehyde.

2. A method in accordance with claim 1 in which said polyols are obtained by reacting said solvent extract with an alkali-metal at a temperature of about −60° to 80° C. in the presence of a reaction solvent now of the group consisting of methylal, dimethyl glycol ether, methyl alkyl ethers, and tetrahydrofuran whereby the alkali-metal adduct of said solvent extract forms, and reacting said alkali-metal adduct with said aldehyde.

3. A method in accordance with claim 2 in which about 30 parts of said solvent extract are reacted with about 1 to 5 parts of said alkali-metal.

4. A method in accordance with claim 3 in which said solvent extracts have an average molecular weight of about 300 to 750 and contain an average of about 1.7 to 3.5 aromatic rings per mean aromatic molecule, and said polyols have a molecular weight of about 300 to 875.

5. A method in accordance with claim 4 in which said polyols are distributed on the surface of the water in a finely divided form.

6. A method in accordance with claim 4 in which said polyols are distributed on the surface of the water in the form of an aqueous dispersion of said polyol in finely divided form.

7. A method in accordance with claim 4 in which said polyols are distributed on the surface of the water in solution in a volatile solvent.

8. A method in accordance with claim 7 in which said solvent is n-pentane.

9. A method of retarding evaporation from an open body of water which comprises distributing on the surface of the water in an amount sufficient to form a monomolecular film on the surface, water-insoluble, complex, aromatic polyols derived from solvent extracts, characterized as being obtained in the solvent extraction of aromatic-rich mineral lubricating oils using a solvent which extracts said aromatics, said polyols prepared, by reacting said solvent extracts with an alkali metal, carbonating said alkali metal-solvent extracts reaction product to form the alkali-metal salt of a complex, aromatic polycarboxylic acid, acidifying said alkali-metal salt and recovering the complex, aromatic polycarboxylic acid, and reducing said complex, aromatic polycarboxylic acid in the presence of a reducing agent.

10. A method in accordance with claim 9 in which said alkali-metal salt is produced by preparing a dispersion of an alkali metal in said solvent extracts at a temperature of about 130° to 190° C., whereby the alkali-metal adduct thereof forms, adding a reaction solvent of the group consisting of methylal, methyl alkyl ethers, tetrahydrofuran, and dimethyl glycol ether to said adduct-dispersion while cooling the reaction mixture to a temperature of about 0° to 40° C., and further cooling the reaction to a temperature of about −50° to −100° C. in the presence of carbon dioxide to carbonate said adduct and form said alkali-metal salt.

11. A method in accordance with claim 10 in which said reducing agent is selected from the group consisting of hydrogen in the presence of a catalyst, sodium in liquid ammonia, sodium in alcohol, sodium amalgam in alcohol, and lithium aluminum hydride.

12. A method in accordance with claim 11 in which said solvent extracts have an average molecular weight of about 300 to 750 and contain an average of about 1.7 to 3.5 aromatic rings per mean aromatic molecule, and said polyols have a molecular weight of about 300 to 875.

13. A method in accordance with claim 12 in which said polyols are distributed on the surface of the water in a finely divided form.

14. A method in accordance with claim 12 in which said polyols are distributed on the surface of the water in the form of an aqueous dispersion of said polyol in finely divided form.

15. A method in accordance with claim 12 in which said polyols are distributed on the surface of the water in solution in a volatile solvent.

16. A method in accordance with claim 15 in which said solvent is n-pentane.

References Cited in the file of this patent

Reservoir Evaporation Reduction with Monomolecular and Similar Films (RERMSF) (Dept. of Interior), Jan. 29, 1957, page 10. (Copy in Division 43.)

UNITED STATES PATENT OFFICE
CERTIFICATE OF CORRECTION

Patent No. 3,112,167 November 26, 1963

Allen F. Millikan et al.

It is hereby certified that error appears in the above numbered patent requiring correction and that the said Letters Patent should read as corrected below.

Column 2, line 17, for "of", second occurrence, read -- or --; line 48, for "lithoum" read -- lithium --; column 4, line 21, strike out "now"; line 22, for "methyal" read -- methylal --.

Signed and sealed this 4th day of August 1964.

(SEAL)
Attest:

ERNEST W. SWIDER
Attesting Officer

EDWARD J. BRENNER
Commissioner of Patents